US011870336B1

(12) United States Patent
Hsiao et al.

(10) Patent No.: US 11,870,336 B1
(45) Date of Patent: Jan. 9, 2024

(54) INPUT SYSTEM WITH VOLTAGE TRANSMISSION FUNCTION AND INPUT DEVICE THEREOF

(71) Applicant: Primax Electronics Ltd., Taipei (TW)

(72) Inventors: Chuan-Tai Hsiao, Taipei (TW); Chun-Han Huang, Taipei (TW); Tse-Ping Kuan, Taipei (TW); Hung-Wei Kuo, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 43 days.

(21) Appl. No.: 17/884,196

(22) Filed: Aug. 9, 2022

(30) Foreign Application Priority Data

Jun. 20, 2022 (TW) .................................. 111122926

(51) Int. Cl.
| | |
|---|---|
| *G06F 13/38* | (2006.01) |
| *G06F 13/40* | (2006.01) |
| *H02M 1/088* | (2006.01) |
| *H02M 3/335* | (2006.01) |

(52) U.S. Cl.
CPC ....... *H02M 1/088* (2013.01); *H02M 3/33569* (2013.01)

(58) Field of Classification Search
CPC .... G06F 13/38; G06F 13/382; G06F 13/1385; G06F 13/387; G06F 13/40; G06F 13/4063; G06F 13/4038
See application file for complete search history.

(56) References Cited

U.S. PATENT DOCUMENTS

2014/0201420 A1* 7/2014 Hsieh .................. G06F 13/4068
710/316
2022/0342839 A1* 10/2022 van Dijk ............... G06F 13/385

\* cited by examiner

*Primary Examiner* — Gary L Laxton
(74) *Attorney, Agent, or Firm* — KIRTON McCONKIE; Evan R. Witt

(57) ABSTRACT

An input system includes a first input device and a second input device. Each of the first input device and the second input device includes a main body, a first connecting port, at least two second connecting ports, a power switching circuit and a control unit. When the first connecting port of the first input device is connected with an external power source, the power switching circuit of the first input device receives a first voltage from the external power source. When one of the second connecting ports of the first input device is connected with one of the second connecting ports of the second input device, the first voltage is converted into a second voltage by the power switching circuit of the first input device and the second voltage is transmitted to the second input device.

13 Claims, 3 Drawing Sheets

INPUT SYSTEM WITH VOLTAGE TRANSMISSION FUNCTION AND INPUT DEVICE THEREOF

FIELD OF THE INVENTION

The present invention relates to an input system, and more particularly to an input system with plural input devices.

BACKGROUND OF THE INVENTION

With the advancement of the modern science and technology, input devices are widely applied in many sectors, including food, clothing, housing, transportation, education and entertainment. For example, smart phones, smart bracelets, keyboards, mouse devices or even the navigation devices of vehicles are widely used in daily lives of modern people.

Conventionally, specified input devices have specified functions only. Generally, when plural different devices are used simultaneously, the input devices need to be individually connected with the corresponding external power sources (e.g., USB ports of a computer). However, different input devices cannot be connected with each other and cooperatively operated with each other. In other words, the uses of plural different input devices are not user-friendly.

For solving the above drawbacks, it is important to provide an input system with plural input devices. The input system has a voltage transmission function. Consequently, the plural input devices can be cooperatively operated with each other.

SUMMARY OF THE INVENTION

The present invention provides an input system with plural input devices. The input system has a voltage transmission function. Consequently, the plural input devices can cooperate with each other. Moreover, the present invention further provides an input device of the input system.

In accordance with an aspect of the present invention, an input system with a voltage transmission function is provided. The input system includes plural input devices. Each of the plural input devices includes a main body, a first connecting port, at least two second connecting ports, a power switching circuit and a control unit. The first connecting port is installed on the main body. The at least two second connecting ports are installed on the main body. The power switching circuit is electrically connected with the first connecting port and the at least two second connecting ports. The control unit is electrically connected with the power switching circuit, the first connecting port and the at least two second connecting ports. The plural input devices include a first input device and a second input device. When the control unit of the first input device detects that the first connecting port of the first input device is connected with an external power source, the control unit of the first input device issues a first switching signal to the power switching circuit of the first input device. Consequently, the first connecting port of the first input device is enabled to receive a first voltage from the external power source. When the control unit of the first input device detects that a selected second connecting port of the at least two second connecting ports of the first input device is connected with a selected second connecting port of the at least two second connecting ports of the second input device, the control unit of the first input device issues a second switching signal to the power switching circuit of the first input device. In response to the second switching signal, the first voltage is converted into a second voltage by the power switching circuit of the first input device, and the selected second connecting port of the first input device is enabled to transmit the second voltage to the second input device.

In an embodiment, when the control unit of the second input device detects that the selected second connecting port of the second input device is connected with the selected second connecting port of the first input device, the control unit of the second input device issues the second switching signal to the power switching circuit of the second input device. In response to the second switching signal, the selected second connecting port of the second input device is enabled to receive the second voltage from the first input device.

In an embodiment, the plural input devices further include a third input device. When the control unit of the second input device detects that an additional selected second connecting port of the at least two second connecting ports of the second input device is connected with a selected second connecting port of the at least two second connecting ports of the third input device, the control unit of the second input device issues the second switching signal to the power switching circuit of the second input device. In response to the second switching signal, the additional selected second connecting port of the second input device is enabled to transmit the second voltage to the third input device.

In an embodiment, when the control unit of the third input device detects that the selected second connecting port of the third input device is connected with the additional selected second connecting port of the second input device, the control unit of the third input device issues the second switching signal to the power switching circuit of the third input device. In response to the second switching signal, the selected second connecting port of the third input device is enabled to receive the second voltage from the second input device.

In an embodiment, the control unit includes a transmission interface, and the control unit is electrically connected with the first connecting port and the at least two second connecting ports through the transmission interface.

In an embodiment, the transmission interface includes a UART interface and a GPIO interface.

In an embodiment, the main body further includes at least one operation interface.

In an embodiment, the operation interface is a key, a handwriting pad or a touchpad.

In accordance with another aspect of the present invention, an input device is provided. The input device includes a main body, a first connecting port, at least two second connecting ports and a control unit. The first connecting port is installed on the main body. The at least two second connecting ports are installed on the main body. The power switching circuit is electrically connected with the first connecting port and the at least two second connecting ports. The control unit is electrically connected with the power switching circuit, the first connecting port and the at least two second connecting ports. When the control unit detects that the first connecting port is connected with an external power source, the control unit issues a first switching signal to the power switching circuit. Consequently, the first connecting port is enabled to receive a first voltage from the external power source. When the control unit detects that a selected second connecting port of the at least two second connecting ports is connected with a connecting port of an adjacent input device, the control unit issues a second switching signal to the power switching circuit. In response to the second switching signal, the first voltage is converted into a second voltage by the power switching circuit, and the selected second connecting port is enabled to transmit the second voltage to the adjacent input device.

In an embodiment, the control unit includes a transmission interface, and the control unit is electrically connected with the first connecting port and the at least two second connecting ports through the transmission interface.

In an embodiment, the transmission interface includes a UART interface and a GPIO interface.

In an embodiment, the main body further includes at least one operation interface.

In an embodiment, the operation interface is a key, a handwriting pad or a touchpad.

From the above descriptions, the present invention provides an input system with a voltage transmission function. When the input system is used, the combination of various input devices may be adjusted according to the preference of the user. Moreover, the number of the input devices with different operation interfaces may be increased or decreased according to the practical use requirements. When the input device is not used, the assembled input devices may be detached from each other. Consequently, the efficacy of storing the input devices is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
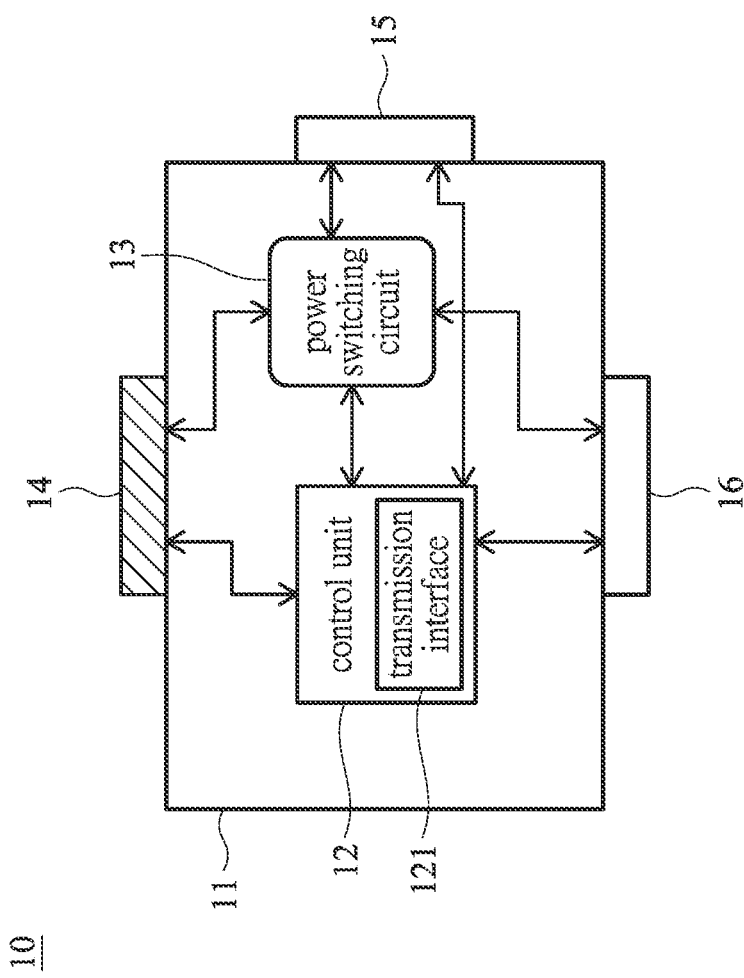
FIG. 1 schematically illustrates an input device according to an embodiment of the present invention.

FIG. 1 schematically illustrates an input device according to an embodiment of the present invention. As shown in FIG. 1, the input device 10 comprises a main body 11, a control unit 12, a power switching circuit 13, a first connecting port 14 and two second connecting ports 15 and 16.

The first connecting port 14 and the two second connecting ports 15 and 16 are installed on the main body 11. The first connecting port 14 is connected with an external power source (e.g., a USB port of a desktop computer).

The control unit 12 comprises a transmission interface 121. The control unit 12 is electrically connected with the first connecting port 14 and the two second connecting ports 15 and 16 through the transmission interface 121. Moreover, the control unit 12 is also electrically connected with the power switching circuit 13. Consequently, the control unit 12 can issue a switching signal to the power switching circuit 13. In an embodiment, the transmission interface 121 comprises a UART interface and a GPIO interface. The transmission interface 121 can detect the connecting states of the first connecting port 14 and the two second connecting ports 15 and 16.

The power switching circuit 13 is electrically connected with the first connecting port 14 and the two second connecting ports 15 and 16. The power switching circuit 13 can receive a voltage from the first connecting port 14 or output a voltage to the two second connecting ports 15 and 16. Moreover, the power switching circuit 13 can convert the received voltage into a regulated voltage for powering the input device 10.

Figure 2:
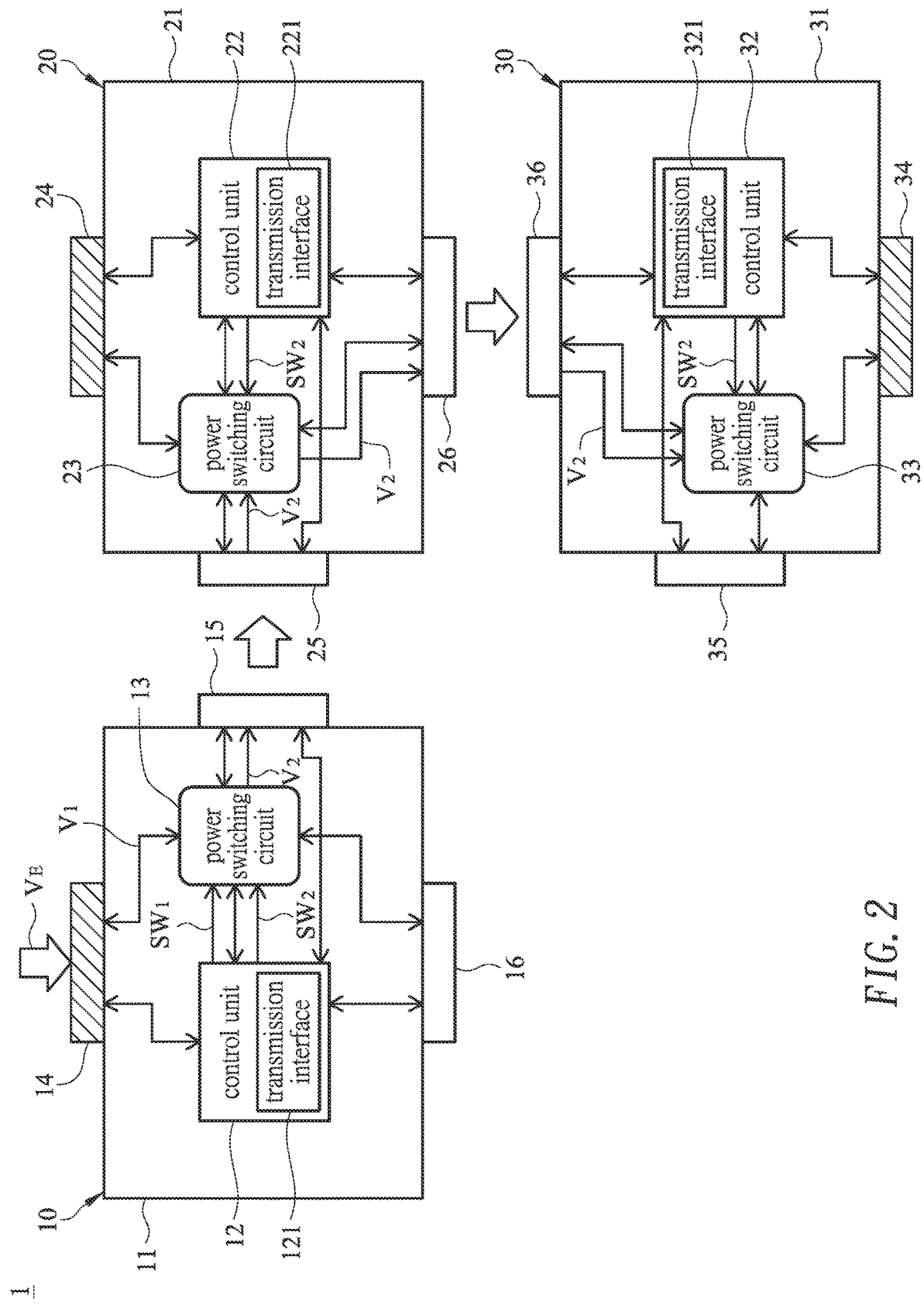
FIG. 2 schematically illustrates the architecture of an input system with a voltage transmission function according to an embodiment of the present invention.

FIG. 2 schematically illustrates the architecture of an input system with a voltage transmission function according to an embodiment of the present invention. As shown in FIG. 2, the input system 1 comprises three input devices 10, 20 and 30. The input device 20 comprises a main body 21, a control unit 22 with a transmission interface 221, a power switching circuit 23, a first connecting port 24 and two second connecting ports 25 and 26. The input device 30 comprises a main body 31, a control unit 32 with a transmission interface 321, a power switching circuit 33, a first connecting port 34 and two second connecting ports 35 and 36. The structures and the functions of associated components of the input devices 20 and 30 are similar to those of the input device 10 as shown in FIG. 1, and not redundantly described herein.

In this embodiment, the second connecting port 15 of the input device 10 is connected with the second connecting port 25 of the input device and the second connecting port 26 of the input device 20 is connected with the second connecting port 36 of the input device 30.

Please refer to FIG. 2 again. When the control unit 12 detects that the first connecting port 14 is connected with an external power source VE through the transmission interface 121, the control unit 12 issues a first switching signal $SW_1$ to the power switching circuit 13 and enables the first connecting port 14. Consequently, the power switching circuit 13 receives a first voltage $V_1$ from the external power source VE. When the control unit 12 detects that the second connecting port 15 of the input device 10 is connected with the second connecting port 25 of the input device 20 through the transmission interface 121, the control unit 12 issues a second switching signal $SW_2$ to the power switching circuit 13. Consequently, the first voltage $V_1$ is converted into a second voltage $V_2$ by the power switching circuit 13, the second connecting port 15 is enabled by the power switching circuit 13. Under this circumstance, the second voltage $V_2$ can be transmitted from the input device 10 to the input device 20.

Similarly, when the control unit 22 of the input device 20 detects that the second connecting port 25 is connected with second connecting port 15 of the input device 10 through the transmission interface 221, the control unit 22 issues the second switching signal $SW_2$ to the power switching circuit 23. Consequently, the second connecting port 25 is enabled to receive the second voltage $V_2$ from the input device 10.

Please refer to FIG. 2 again. Similarly, when the control unit 22 detects that the second connecting port 26 of the input device 20 is connected with the second connecting port 36 of the input device 30 through the transmission interface 221, the control unit 22 issues the second switching signal $SW_2$ to the power switching circuit 23. Consequently, the second connecting port 26 is enabled by the power switching circuit 23. Under this circumstance, the second voltage $V_2$ can be transmitted from the second input device 20 to the input device 30.

Similarly, when the control unit 32 of the input device 30 detects that the second connecting port 36 is connected with second connecting port 26 of the input device 20 through the transmission interface 321, the control unit 32 issues the second switching signal $SW_2$ to the power switching circuit 23. Consequently, the second connecting port 36 is enabled to receive the second voltage $V_2$ from the input device 20.

It is noted that numerous modifications and alterations may be made while retaining the teachings of the invention. For example, in a variant example, the first connecting port 24 of the input device 20 is connected with the external power source VE to receive the first voltage $V_1$. When the control unit 22 detects that the second connecting port 25 is connected with the second connecting port 15 of the input device 10 and the second connecting port 26 is connected with the second connecting port 36 of the input device 30, the first voltage $V_1$ is converted into a second voltage $V_2$ by the power switching circuit 23, and the second connecting ports 25 and 26 are enabled by the power switching circuit 23. Under this circumstance, the second voltage $V_2$ can be transmitted from the input device to the input devices 10 and 30.

Figure 3:
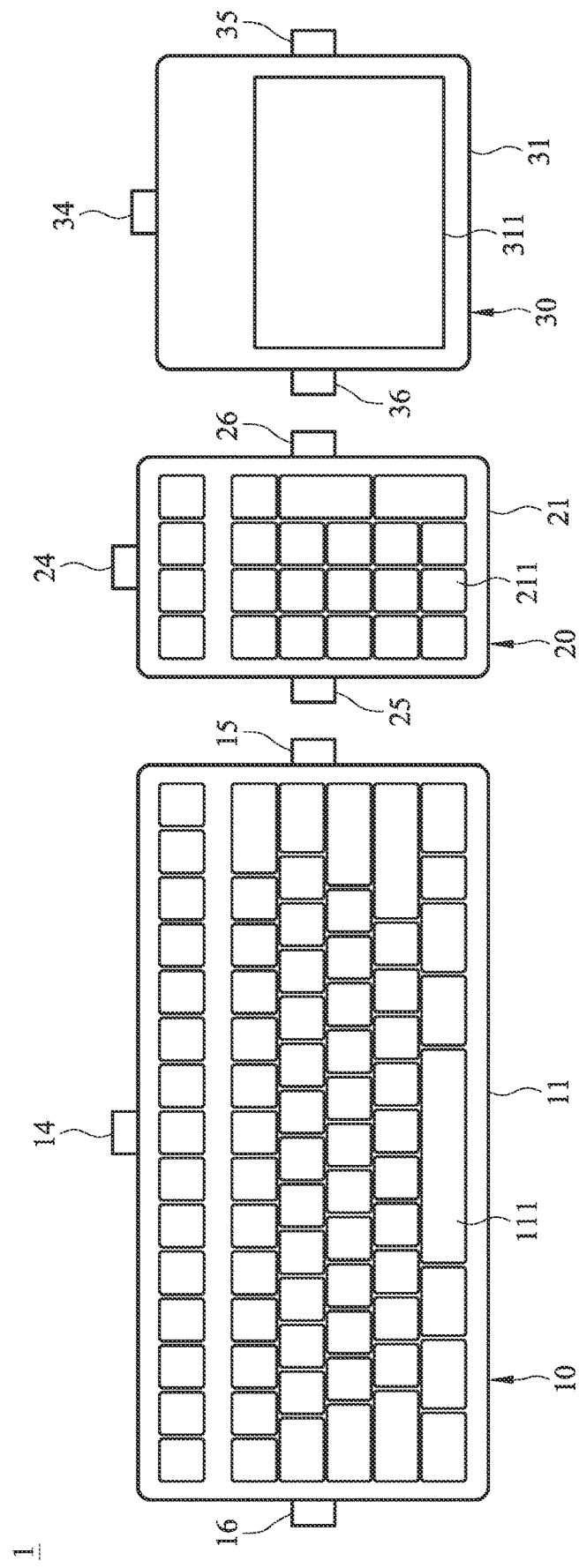
FIG. 3 is a schematic top view illustrating an example of an input system with a voltage transmission function according to an embodiment of the present invention.

In the above embodiment, the input system comprises three input devices, and each input device comprises one connecting port and two second connecting ports. It is noted that numerous modifications and alterations may be made while retaining the teachings of the invention. For example, in another embodiment, the input system comprises two input devices. Moreover, the number of the second connecting ports may be increased or decreased according to the practical use requirements. For example, in some other embodiments, four second connecting ports are respectively located at a top side, a bottom side, a left side and a right side of the input device. Consequently, another input device can be selectively connected with one of the second connecting ports at the top side, the bottom side, the left side and the right side of the input device Please refer to FIG. 2 and FIG. 3. FIG. 3 is a schematic top view illustrating an example of an input system with a voltage transmission function according to an embodiment of the present invention. In this embodiment, the input system 1 is a composite keyboard. The input device comprises a main body 11, a control unit 12, a power switching circuit 13, a first connecting port 14 and two second connecting ports 15 and 16. The input device 20 comprises a main body 21, a control unit 22, a power switching circuit 23, a first connecting port 24 and two second connecting ports 25 and 26. The input device 30 comprises a main body 31, a control unit 32, a power switching circuit 33, a first connecting port 34 and two second connecting ports 35 and 36. Moreover, an operation interface 111 is installed on the main body 11 of the input device 10, an operation interface 211 is installed on the main body 21 of the input device 20, and an operation interface 311 is installed on the main body 31 of the input device 30.

In an embodiment, the operation interface 111 is a main keyboard region with plural typing keys, the operation interface 211 is a numeric auxiliary keyboard region with plural numeric keys, and the operation interface 311 is a handwriting pad or a touchpad.

When the input device 1 is used, the combination of the input devices 10, 20 and 30 may be adjusted according to the operating preference of the user. For example, the second connecting port 26 of the input device is connected with the second connecting port 16 of the input device 10, and the second connecting port 36 of the input device 30 is connected with the second connecting port 15 of the input device 10. That is, the input device 20 with the operation interface 211 (i.e., the numeric auxiliary keyboard region) is installed on the left side of the input device 10, and the input device 30 with the operation interface 311 (i.e., the handwriting pad or the touchpad) is installed on the right side of the input device 10.

Moreover, the number of the operation interfaces may be increased or decreased according to the practical use requirements. For example, in case that there is no need to input numbers, only the combination of the input device 10 with the operation interface 111 (i.e., the main keyboard region) and the input device 30 with the operation interface 311 (i.e., the handwriting pad or the touchpad) is feasible.

From the above descriptions, the present invention provides an input system with a voltage transmission function. When the input system is used, the combination of various input devices may be adjusted according to the preference of the user. Moreover, the number of the input devices with different operation interfaces may be increased or decreased according to the practical use requirements. When the input device is not used, the assembled input devices may be detached from each other. Consequently, the efficacy of storing the input devices is enhanced. In other words, the input system of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An input system with a voltage transmission function, the input system comprising plural input devices, each of the plural input devices comprising:
   a main body;
   a first connecting port installed on the main body;
   at least two second connecting ports installed on the main body;
   a power switching circuit electrically connected with the first connecting port and the at least two second connecting ports; and
   a control unit electrically connected with the power switching circuit, the first connecting port and the at least two second connecting ports,
   wherein the plural input devices comprise a first input device and a second input device,
   wherein when the control unit of the first input device detects that the first connecting port of the first input device is connected with an external power source, the control unit of the first input device issues a first switching signal to the power switching circuit of the first input device, so that the first connecting port of the first input device is enabled to receive a first voltage from the external power source,
   wherein when the control unit of the first input device detects that a selected second connecting port of the at least two second connecting ports of the first input device is connected with a selected second connecting port of the at least two second connecting ports of the second input device, the control unit of the first input device issues a second switching signal to the power switching circuit of the first input device, wherein in response to the second switching signal, the first voltage is converted into a second voltage by the power switching circuit of the first input device, and the selected second connecting port of the first input device is enabled to transmit the second voltage to the second input device.

2. The input system according to claim 1, wherein when the control unit of the second input device detects that the selected second connecting port of the second input device is connected with the selected second connecting port of the first input device, the control unit of the second input device issues the second switching signal to the power switching circuit of the second input device, wherein in response to the second switching signal, the selected second connecting port of the second input device is enabled to receive the second voltage from the first input device.

3. The input system according to claim 1, wherein the plural input devices further comprise a third input device, wherein when the control unit of the second input device detects that an additional selected second connecting port of the at least two second connecting ports of the second input device is connected with a selected second connecting port of the at least two second connecting ports of the third input device, the control unit of the second input device issues the second switching signal to the power switching circuit of the second input device, wherein in response to the second switching signal, the additional selected second connecting port of the second input device is enabled to transmit the second voltage to the third input device.

4. The input system according to claim 3, wherein when the control unit of the third input device detects that the selected second connecting port of the third input device is connected with the additional selected second connecting port of the second input device, the control unit of the third input device issues the second switching signal to the power switching circuit of the third input device, wherein in response to the second switching signal, the selected second connecting port of the third input device is enabled to receive the second voltage from the second input device.

5. The input system according to claim 1, wherein the control unit comprises a transmission interface, and the control unit is electrically connected with the first connecting port and the at least two second connecting ports through the transmission interface.

6. The input system according to claim 5, wherein the transmission interface comprises a UART interface and a GPIO interface.

7. The input system according to claim 1, wherein the main body further comprises at least one operation interface.

8. The input system according to claim 7, wherein the operation interface is a key, a handwriting pad or a touchpad.

9. An input device, comprising:
a main body;
a first connecting port installed on the main body;
at least two second connecting ports installed on the main body;
a power switching circuit electrically connected with the first connecting port and the at least two second connecting ports; and
a control unit electrically connected with the power switching circuit, the first connecting port and the at least two second connecting ports,
wherein when the control unit detects that the first connecting port is connected with an external power source, the control unit issues a first switching signal to the power switching circuit, so that the first connecting port is enabled to receive a first voltage from the external power source,
wherein when the control unit detects that a selected second connecting port of the at least two second connecting ports is connected with a connecting port of an adjacent input device, the control unit issues a second switching signal to the power switching circuit, wherein in response to the second switching signal, the first voltage is converted into a second voltage by the power switching circuit, and the selected second connecting port is enabled to transmit the second voltage to the adjacent input device.

10. The input device according to claim 9, wherein the control unit comprises a transmission interface, and the control unit is electrically connected with the first connecting port and the at least two second connecting ports through the transmission interface.

11. The input device according to claim 10, wherein the transmission interface comprises a UART interface and a GPIO interface.

12. The input device according to claim 9, wherein the main body further comprises at least one operation interface.

13. The input device according to claim 12, wherein the operation interface is a key, a handwriting pad or a touchpad.

* * * * *